(12) United States Patent
Wang et al.

(10) Patent No.: US 6,714,408 B1
(45) Date of Patent: Mar. 30, 2004

(54) MECHANISM FOR PIVOTABLY COUPLING NOTEBOOK COMPUTER TO ITS DISPLAY

(75) Inventors: Shih-Hsuan Wang, Taipei (TW); Yu-Chi Lin, Taipei (TW)

(73) Assignee: Inventec Corporation, Taipei (TW)

( * ) Notice: Subject to any disclaimer, the term of this patent is extended or adjusted under 35 U.S.C. 154(b) by 25 days.

(21) Appl. No.: 10/600,339

(22) Filed: Jun. 23, 2003

(51) Int. Cl.⁷ .................................................. G06F 1/16
(52) U.S. Cl. ..................... 361/683; 345/156; 16/333; 248/918; 292/358; 292/209
(58) Field of Search ................... 361/680–683; 248/917–924; 16/333–337; 292/358, 209, 279, 274, 210, 18; 345/905, 156, 169

(56) References Cited

U.S. PATENT DOCUMENTS

| | | | |
|---|---|---|---|
| 5,253,142 A | * 10/1993 | Weng | 361/681 |
| 6,310,766 B1 | * 10/2001 | Bae | 361/681 |
| 6,392,871 B1 | * 5/2002 | Yanase | 361/681 |
| 6,430,038 B1 | * 8/2002 | Helot et al. | 361/681 |
| 2003/0034952 A1 | * 2/2003 | Wang et al. | 345/156 |

* cited by examiner

Primary Examiner—Lisa Lea-Edmonds
(74) Attorney, Agent, or Firm—Bacon & Thomas, PLLC

(57) ABSTRACT

The present invention is to provide a mechanism for pivotably coupling a notebook computer to its display, wherein a keyboard is received in a forward recess of a housing of the notebook computer, and a substantially rectangular pivot board is received in a rearward recess of the housing, the pivot board has a forward side hingedly coupled to the keyboard and a rearward side hingedly coupled to the display so that the display is adapted to pivot upward for adjusting height and position thereof relative to the housing.

8 Claims, 5 Drawing Sheets

MECHANISM FOR PIVOTABLY COUPLING NOTEBOOK COMPUTER TO ITS DISPLAY

FIELD OF THE INVENTION

The present invention relates to notebook computers and more particularly to an improved mechanism for pivotably coupling a notebook computer to its display.

BACKGROUND OF THE INVENTION

Electronics and material science have known a rapid, spectacular development in recent years. A wide variety of electronic products are commercially available due to the progress of electronic components manufacturing technology. As a result, manufacturing cost of electronic products is greatly reduced, functions of electronic products are more powerful, and most importantly, quality of electronic products are improved. Moreover, miniature semiconductor devices have replaced conventional bulky electronic elements (e.g., vacuum tubes) due to the progress of semiconductor technology. Nowadays, electronic products are characterized by slimness, lightweight, and portability so as to keep up with the trend and the demand. Further, convenience in use and popularity among vast consumers of electronic products are greatly increased. For example, many high performance, low price electronic products (e.g., notebook computers, etc.) are affordable by vast consumers.

Conventionally, a notebook computer and its display are hingedly coupled together. For opening the notebook computer, a user has to pivot the display upward. To the contrary for closing the notebook computer, a user has to pivot the display downward. As to relative positioning of the notebook computer and its display, it is not available yet. This is monotonous. Further, there is no way to adjust height of the display to be positioned at an optimum view angle. In view of the above, the prior notebook computers are unsatisfactory and lack diversity. Hence, a need for improvement exists.

SUMMARY OF THE INVENTION

A primary object of the present invention is to provide a mechanism for pivotably coupling a notebook computer to its display so that height and position adjustment of the display relative to the notebook computer can be carried out as desired. By utilizing this, the above drawbacks of the prior art can be overcome. These drawbacks are that there are no provision of both relative positioning of the notebook computer and the display and height adjustment of the display to be positioned at an optimum view angle.

In one aspect of the present invention a keyboard is received in a forward recess of a housing of the notebook computer, and a substantially rectangular pivot board is received in a rearward recess of the housing, the pivot board having a forward side hingedly coupled to the keyboard and a rearward side hingedly coupled to the display so that the display is adapted to pivot upward for adjusting height and position thereof relative to the housing.

In another aspect of the present invention a plate-shaped latch device is provided under the pivot board within the housing. The latch device comprises an elongated latch board at either side, a trigger between the latch boards, a finger tab on a top of the trigger, the finger tab being projected from an opening of the pivot board, and a latch member at an outer end of either latch board distal from the trigger, the latch members being projected from the housing to snap into side cavities of the pivot board for fastening the pivot board and the housing together. A forward movement of the trigger causes the latch members to move toward both left and right sides of the housing to disengage the latch members from the pivot board for being adapted to pivot both the pivot board and the display upward for adjusting both the height and the position of the display relative to the housing.

In a further aspect of the present invention, there are further provided two side holes in the rearward recess of the housing, a button in either hole, the button having an upper part protruded from the hole and a lower part concealed inside the housing, a disc-shaped seat having a diameter slightly larger than that of the hole disposed at a lower part of either button, and a resilient member (e.g., spring) under either button, a bottom of the resilient member being urged against the bottom of the housing so that in response to the disengagement of the latch members from the pivot board, the buttons are adapted to push the pivot board upward by an expansion of the second resilient members and clear the pivot board from the rearward recess of the housing.

The above and other objects, features and advantages of the present invention will become apparent from the following detailed description taken with the accompanying drawings.

DETAILED DESCRIPTION OF THE PREFERRED EMBODIMENTS

Figure 1:
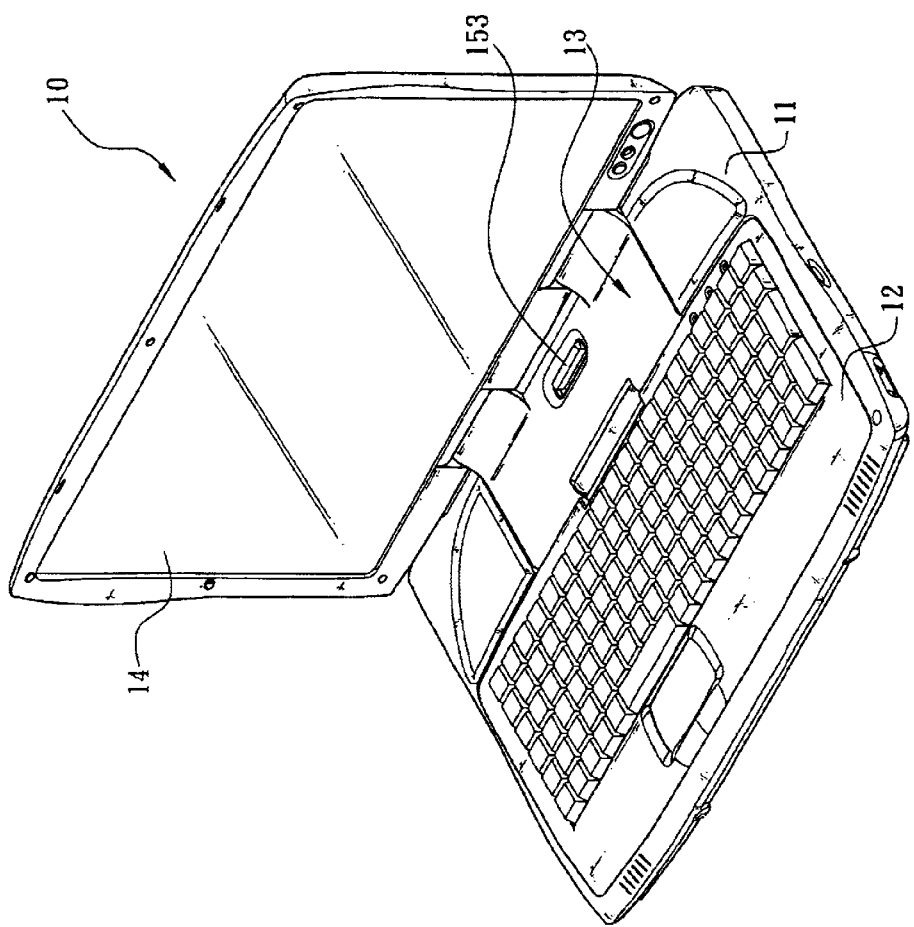
FIG. 1 is a perspective view of a notebook computer incorporating a mechanism for pivotably coupling the notebook computer to its display according to the invention.
Figure 5:
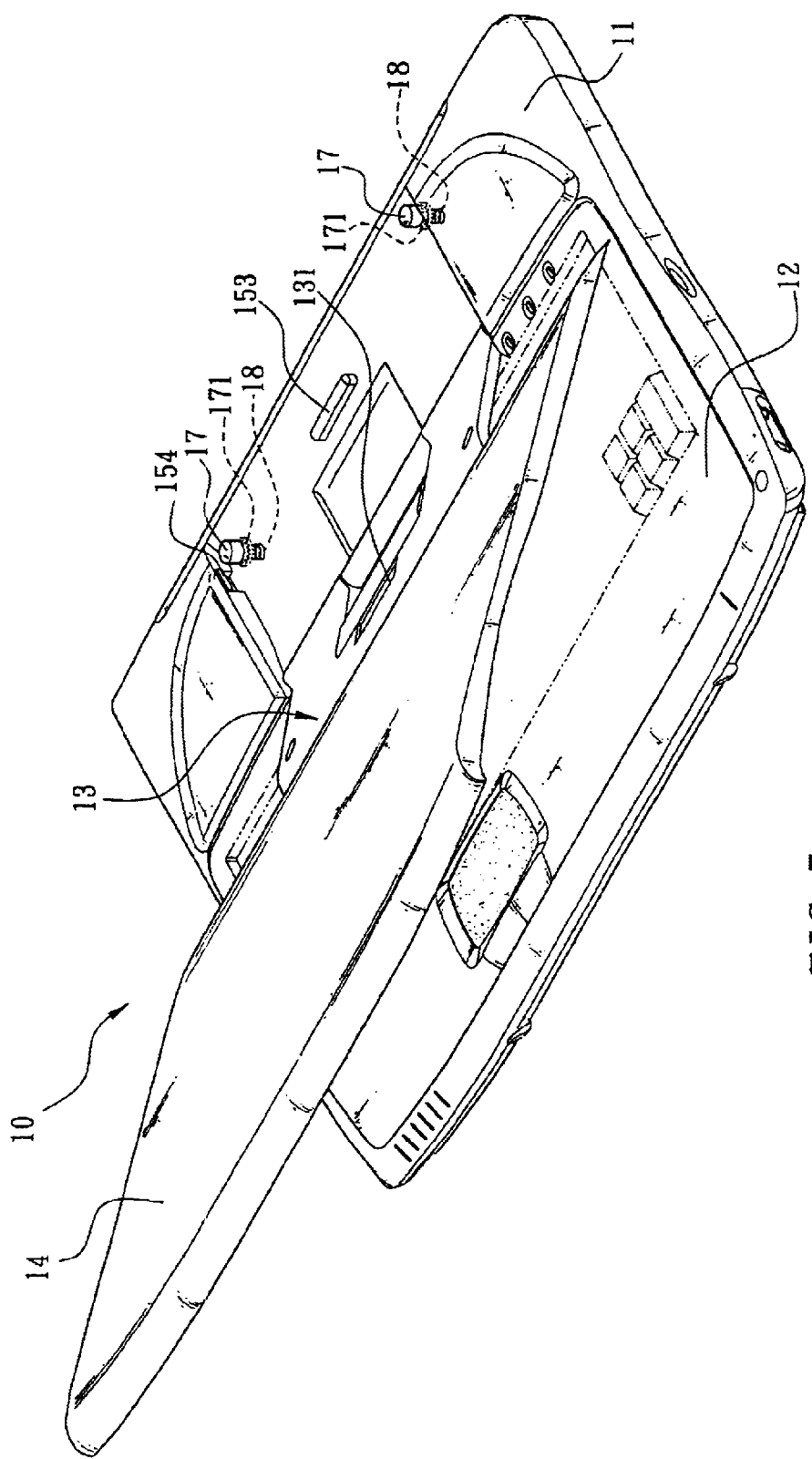
FIG. 5 is a perspective view depicting height and position adjustment of the display relative to the notebook computer.

Referring to FIGS. 1 and 5, there are shown a notebook computer 10 incorporating a mechanism for pivotably coupling the notebook computer 10 to its display 14 in accordance with the invention. A housing 11 of the notebook computer 10 comprises a forward recess with a keyboard 12 received therein and a rearward recess with a substantially rectangular pivot board 13 received therein. The pivot board 13 and the keyboard 12 are hingedly coupled together at adjacent sides thereof (i.e., at a forward side of the pivot board 13). A rearward side of the pivot board 13 is also hingedly coupled to the display 14 of the notebook computer 10. As such, both the display 14 and the pivot board 13 are adapted to pivot upward for adjusting height and position of the display 14 relative to the housing 11.

Figure 2:
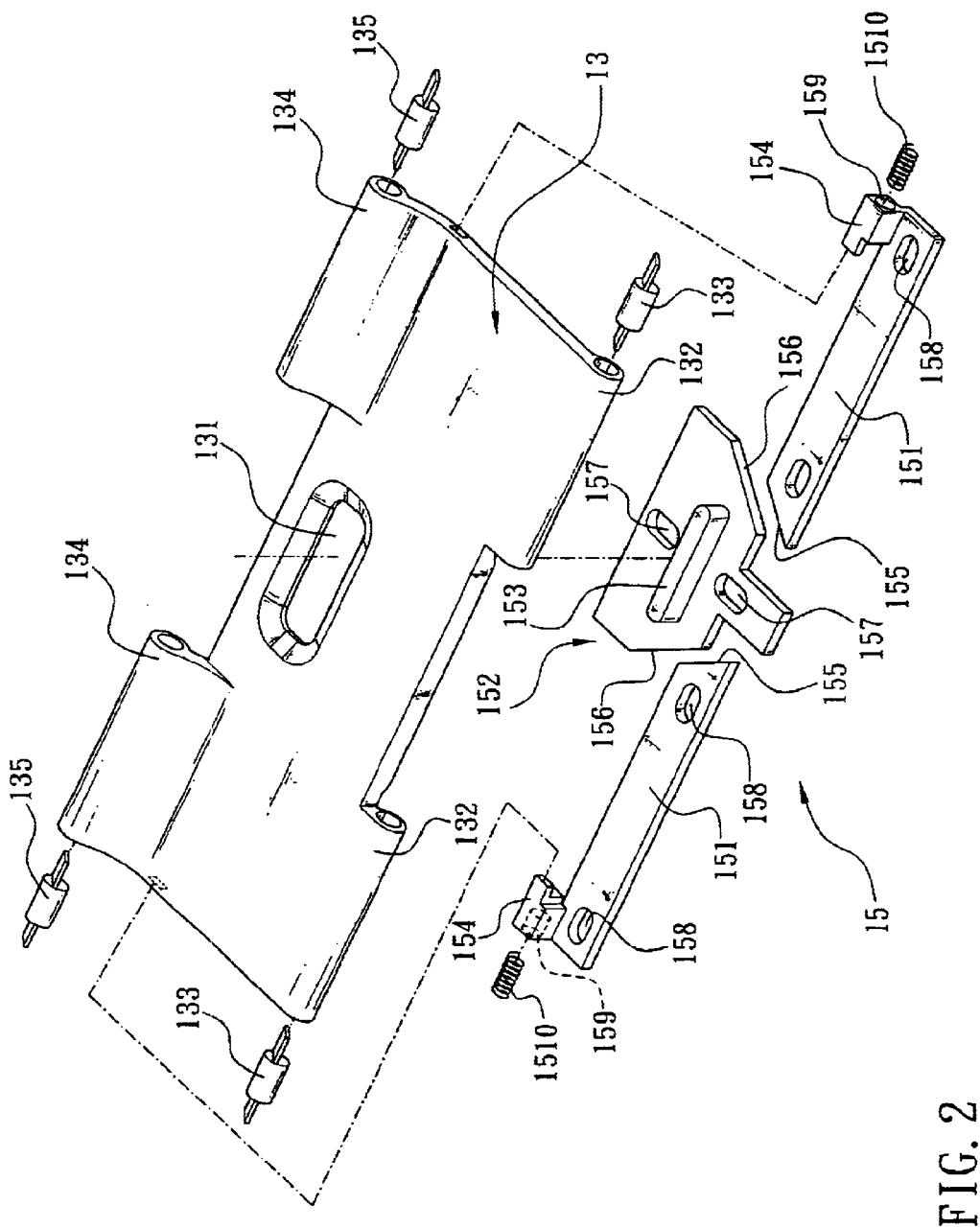
FIG. 2 is an exploded view of the mechanism.
Figure 3:
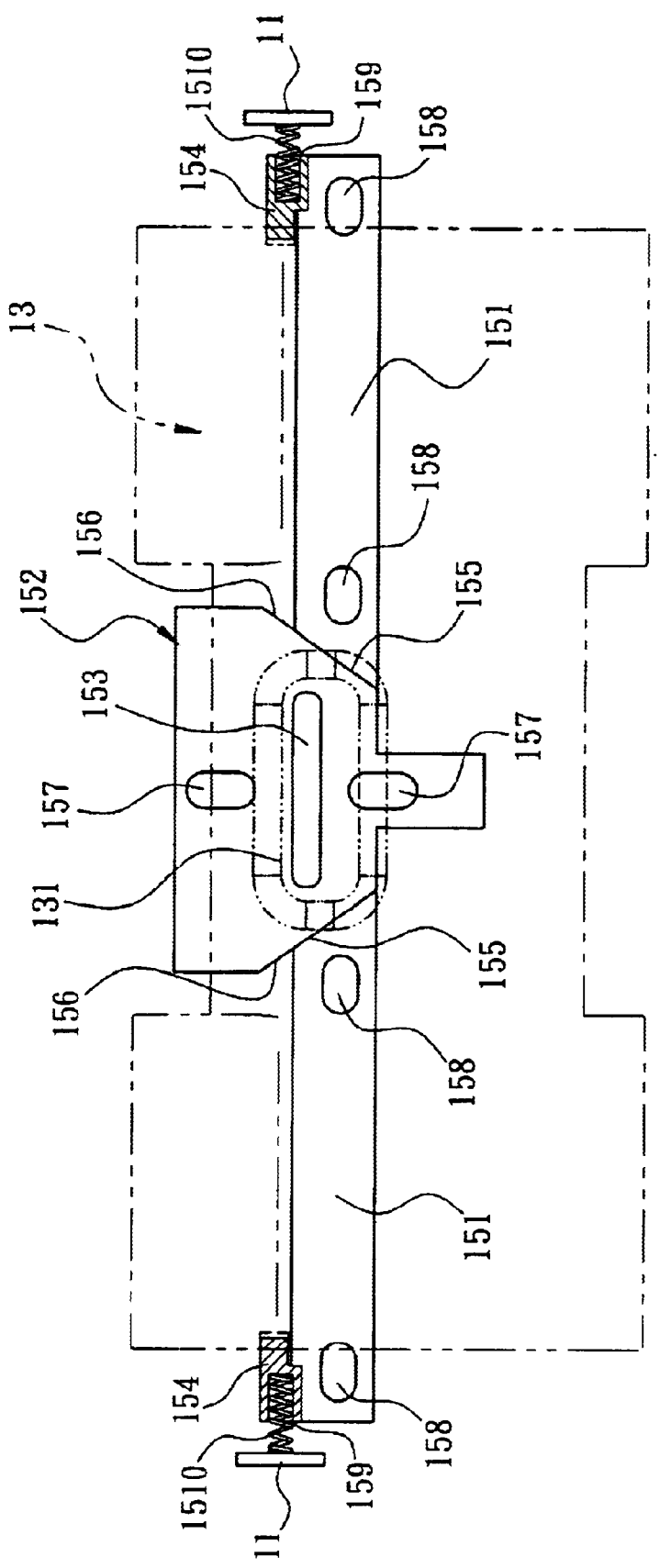
FIG. 3 is a top plan view schematically depicting an operating position of the mechanism.

Referring to FIGS. 2 and 3 in conjunction with FIG. 1, a plate-shaped latch device 15 is provided under the pivot board 13 within the housing 11. The latch device 15 comprises an elongated latch board 151 at either side, a trigger 152 between the latch boards 151, an elongated finger tab 153 on top of the trigger 152, the finger tab 153 being projected from an opening 131 of the pivot board 13, and a latch member 154 at an outer end of either latch board 151 distal from the trigger 152, the latch members 154 being projected from the housing 11 to snap into side cavities of the pivot board 13 so as to fasten the pivot board 13 and the housing 11 together.

Figure 4:
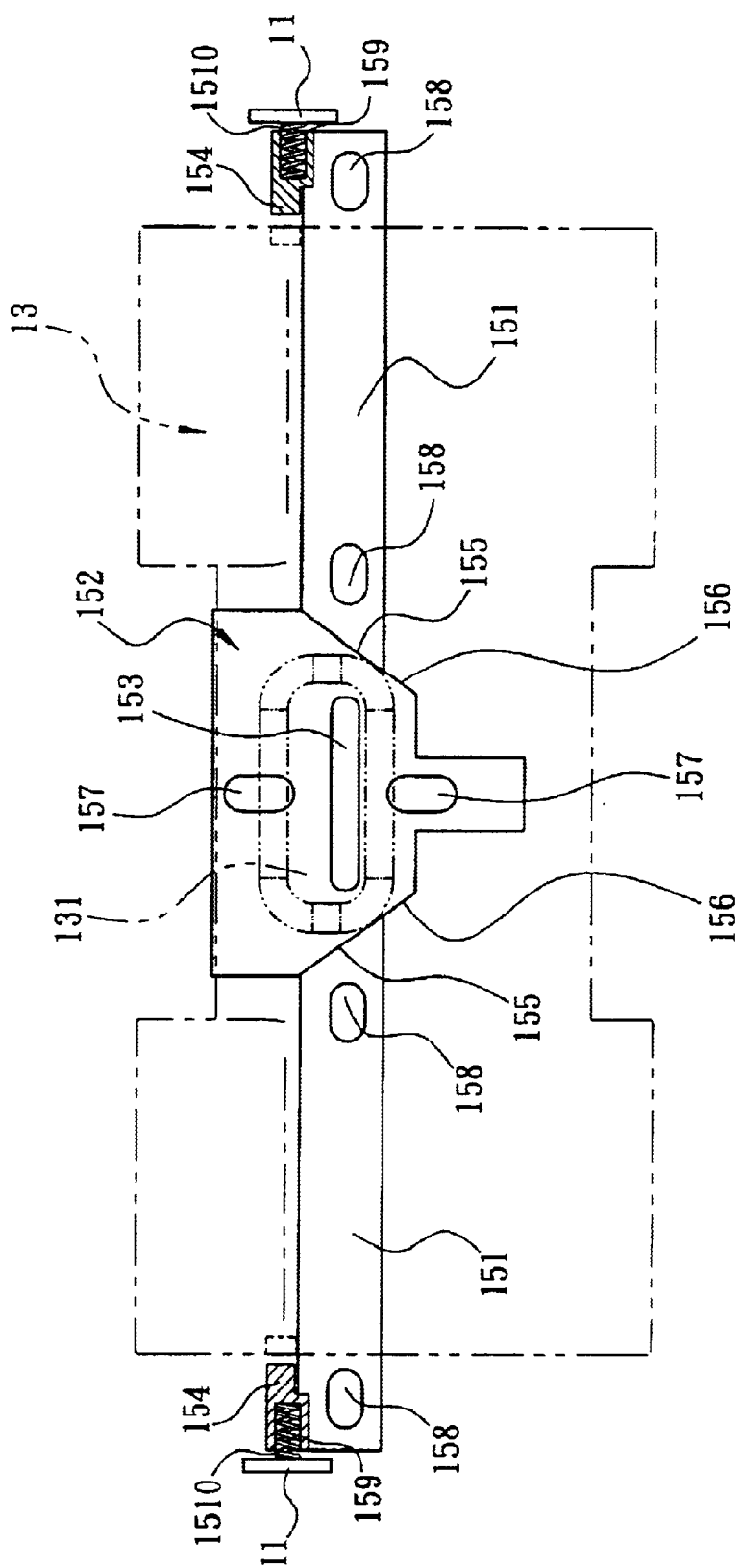
FIG. 4 is a view similar to FIG. 3 depicting another operating position of the mechanism.

Referring to FIG. 4 in conjunction with FIGS. 2 and 3, the latch board 151 comprises a slanted surface 155 at one side adjacent the trigger 152. The trigger 152 comprises a slanted surface 156 at either side adapted to matingly couple to the slanted surface 155 so that a forward movement of the trigger 152 may cause the slanted surfaces 155 to move outward (i.e., both left and right sides of the notebook computer 10) and cause the latch members 154 to move outward to disengage the latch members 154 from the pivot board 13. At this time, a user can pivot the display 14 upward for adjusting height and position of the display 14 relative to the housing 11 (see FIG. 5).

Referring to FIGS. 4 and 5 again, in the invention in the rearward recess of the housing 11 two side holes are provided each with a button 17 formed therein. A disc-shaped seat 171 having a diameter slightly larger than that of the hole is provided at a lower part of either button 17. An upper part of the button 17 is protruded from the hole and a lower part thereof is concealed inside the housing 11. A resilient member (e.g., spring) 18 is provided under either button 17. A bottom of the resilient member 18 is urged against a bottom of the housing 11. Hence, the buttons 17 can push the pivot board 13 upward by the expansion of the resilient members 18 in response to the disengagement of the latch members 154 from the pivot board 13. Eventually, the pivot board 13 clears from the rearward recess of the housing 11.

Referring to FIGS. 2, 3, and 4 again, in the invention a plurality of apertures 157 are provided on the trigger 152 so that a user can drive a plurality of fasteners (e.g., screws) through the apertures 157 to moveably fasten the trigger 152 at the bottom of the housing 11.

Referring to FIGS. 2, 3, and 4 again, in the invention a plurality of apertures 158 are provided on either latch board 151 so that a user can drive a plurality of fasteners (e.g., screws) through the apertures 158 to moveably fasten the latch board 151 at the bottom of the housing 11.

Referring to FIGS. 2, 3, and 4 again, in the invention a lateral tunnel 159 is formed at the latch member 154 of either latch board 151 facing inside of the housing 11 and a second resilient member (e.g., spring) 1510 is anchored in the tunnel 159. An outer end of the second resilient member 1510 is biased against inside of the housing 11. As such, a forward movement of the trigger 152 may cause the latch boards 151 to move outward to disengage the latch members 154 from the pivot board 13 by compressing the second resilient member 1510. To the contrary, a rearward movement of the trigger 152 may cause the latch boards 151 to move inward to engage the latch members 154 with the pivot board 13 by expanding the second resilient member 1510.

Referring to FIGS. 1 and 2 again, in the invention two spaced first pivot tubes 132 are formed at a forward side of the pivot board 13. Two first pins 133 are inserted into the first pivot tubes 132 and the housing 11 (i.e., one ends of the first pins 133 concealed in the first pivot tubes 132 and the other ends thereof concealed in the housing 11 respectively) for pivotably coupling the pivot board 13 and the housing 11 together.

Referring to FIGS. 1 and 2 again, in the invention two spaced second pivot tubes 134 are formed at a rearward side of the pivot board 13. Two second pins 135 are inserted into the second pivot tubes 134 and the display 14 (i.e., one ends of the second pins 135 concealed in the second pivot tubes 134 and the other ends thereof concealed in the housing 11 respectively) for pivotably coupling the pivot board 13 and the display 14 together.

Referring to FIGS. 1 and 5 again, in the invention each of the housing 11, the keyboard 12, the pivot board 13, and the display 14 is made of an aluminum and magnesium alloy so as to form a compact, structurally enhanced notebook computer 10.

While the invention has been described by means of specific embodiments, numerous modifications and variations could be made thereto by those skilled in the art without departing from the scope and spirit of the invention set forth in the claims.

What is claimed is:

1. A mechanism for pivotably coupling a notebook computer to a display thereof, the notebook computer including a housing having a forward recess with a keyboard received therein, comprising:

a substantially rectangular pivot board received in a rearward recess of the housing, the pivot board having a forward side hingedly coupled to the keyboard and a rearward side hingedly coupled to the display so that the display is adapted to pivot upward for adjusting height and position thereof relative to the housing; and a plate-shaped latch device under the pivot board within the housing, the latch device comprising an elongated latch board at either side, a trigger between the latch boards, a finger tab on a top of the trigger, the finger tab being projected from an opening of the pivot board, and a latch member at an outer end of either latch board distal from the trigger, the latch members being projected from the housing to snap into side cavities of the pivot board for fastening the pivot board and the housing together, wherein a forward movement of the trigger causes the latch members to move toward both left and right sides of the housing to disengage the latch members from the pivot board for being adapted to pivot both the pivot board and the display upward for adjusting both the height and the position of the display relative to the housing.

2. The mechanism of claim 1, wherein the latch board comprises a first slanted surface at one side adjacent the trigger and the trigger comprises a second slanted surface at either side adapted to matingly couple to the first slanted surface so that the forward movement of the trigger causes the first slanted surfaces to move toward both the left and the right sides of the housing, causes the latch members to move toward both the left and the right sides to disengage the latch members from the pivot board, and both the pivot bard and the display are adapted to pivot upward for adjusting both the height and the position of the display relative to the housing.

3. The mechanism of claim 2, further comprising a plurality of first apertures on the trigger so that a plurality of screws are adapted to drive through the first apertures to moveably fasten the trigger at a bottom of the housing.

4. The mechanism of claim 3, wherein a plurality of second apertures on either latch board so that a plurality of screws are adapted to drive through the second apertures to moveably fasten the latch board at the bottom of the housing.

5. The mechanism of claim 4, further comprising a lateral tunnel at either latch member facing inside of the housing and a first resilient member anchored in the tunnel, the first resilient member having an outer end biased against inside of the housing so that the forward movement of the trigger moves the latch boards to disengage the latch members from the pivot board by compressing the first resilient member, and a rearward movement of the trigger moves the latch boards inward to engage the latch members with the pivot board by expanding the first resilient member.

6. The mechanism of claim 1, further comprising two side holes in the rearward recess of the housing, a button in either hole, the button having an upper part protruded from the hole and a lower part concealed inside the housing, a disc-shaped seat having a diameter slightly larger than that of the hole disposed at a lower part of either button, and a second resilient member under either button, a bottom of the second resilient member being urged against the bottom of the housing so that in response to the disengagement of the latch members from the pivot board, the buttons are adapted to push the pivot board upward by an expansion of the second resilient members and clear the pivot board from the rearward recess of the housing.

7. The mechanism of claim 1, further comprising two spaced first pivot tubes at the forward side of the pivot board and two first pins inserted into the first pivot tubes and the housing with one ends of the first pins concealed in the first pivot tubes and the other ends thereof concealed in the housing respectively for pivotably coupling the pivot board and the housing together.

8. The mechanism of claim 7, further comprising two spaced second pivot tubes at the rearward side of the pivot board and two second pins inserted into the second pivot tubes and the display with one ends of the second pins concealed in the second pivot tubes and the other ends thereof concealed in the housing respectively for pivotably coupling the pivot board and the display together.

\* \* \* \* \*